US010048933B2

(12) United States Patent
Reponen et al.

(10) Patent No.: US 10,048,933 B2
(45) Date of Patent: Aug. 14, 2018

(54) APPARATUS AND METHOD FOR AUDIO REACTIVE UI INFORMATION AND DISPLAY

(71) Applicant: Nokia Technologies Oy, Espoo (FI)

(72) Inventors: Erika Reponen, Tampere (FI); Ravi Shenoy, Bangalore (IN); Mikko Tammi, Tampere (FI); Sampo Vesa, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 469 days.

(21) Appl. No.: 14/361,255

(22) PCT Filed: Nov. 21, 2012

(86) PCT No.: PCT/FI2012/051149
§ 371 (c)(1),
(2) Date: May 28, 2014

(87) PCT Pub. No.: WO2013/079781
PCT Pub. Date: Jun. 6, 2013

(65) Prior Publication Data
US 2014/0337741 A1    Nov. 13, 2014

(30) Foreign Application Priority Data
Nov. 30, 2011 (IN) .......................... 4155/CHE/2011

(51) Int. Cl.
*G06F 3/0484* (2013.01)
*G06F 3/16* (2006.01)
(Continued)

(52) U.S. Cl.
CPC .............. *G06F 3/167* (2013.01); *G01S 3/801* (2013.01); *G06F 1/1694* (2013.01);
(Continued)

(58) Field of Classification Search
None
See application file for complete search history.

(56) References Cited

U.S. PATENT DOCUMENTS 5,812,688 A * 9/1998 Gibson ................ G10H 1/0008
381/119
5,850,455 A * 12/1998 Arnold ...................... H04S 3/00
381/1

(Continued)

FOREIGN PATENT DOCUMENTS

CN         1642177 A       7/2005
CN       101110215 A       1/2008
(Continued)

OTHER PUBLICATIONS

"iPod to Create Its Own Screen Saver Based on the Surrounding", The Mobile Indian, Retrieved on Oct. 15, 2014, Webpage available at : http://www.themobileindian.com/news/1169_iPod-to-create-its-own-screen-saver-based-on-the-surrounding.
(Continued)

Primary Examiner — Phenuel Salomon
(74) Attorney, Agent, or Firm — Harrington & Smith

(57) ABSTRACT

A method includes determining, using signals captured from two or more microphones (1A) configured to detect an acoustic signal from one or more sound sources, one or more prominent sound sources based on the one or more sound sources (1C-1D). The method further includes determining one or more directions relative to a position of one or more of the two or more microphones for the one or more prominent sound sources (1B-1D). The method includes modifying one or more user interface elements displayed on a user interface of a display to provide an indication at least in part of the one or more directions, relative to position of at least one microphone, of the one or more prominent sound sources (1G).

18 Claims, 10 Drawing Sheets

(51) Int. Cl.
*G01S 3/801* (2006.01)
*G06F 1/16* (2006.01)
*G06F 3/0346* (2013.01)
*G06F 3/0481* (2013.01)
*H04W 4/04* (2009.01)
*G06F 3/0487* (2013.01)

(52) U.S. Cl.
CPC .......... *G06F 3/0346* (2013.01); *G06F 3/0484* (2013.01); *G06F 3/0487* (2013.01); *G06F 3/04817* (2013.01); *H04W 4/043* (2013.01)

(56) References Cited

U.S. PATENT DOCUMENTS

| | | | | |
|---|---|---|---|---|
| 6,140,565 | A * | 10/2000 | Yamauchi | G10H 1/0008 84/477 R |
| 6,608,903 | B1 * | 8/2003 | Miyazaki | H04R 3/005 381/17 |
| 7,227,960 | B2 * | 6/2007 | Kataoka | B25J 13/003 381/92 |
| 7,928,311 | B2 * | 4/2011 | Trivi | G10H 1/0066 381/310 |
| 8,204,248 | B2 * | 6/2012 | Haulick | G01S 7/52003 381/122 |
| 2002/0196294 | A1 * | 12/2002 | Sesek | G06Q 10/109 715/867 |
| 2003/0072460 | A1 * | 4/2003 | Gonopolskiy | H04R 3/005 381/92 |
| 2003/0156722 | A1 * | 8/2003 | Taenzer | H04R 1/08 381/92 |
| 2006/0279418 | A1 * | 12/2006 | Albert | A61B 7/003 340/521 |
| 2007/0195012 | A1 | 8/2007 | Ichikawa et al. | |
| 2008/0052624 | A1 * | 2/2008 | Roberts | H04N 5/4403 715/716 |
| 2008/0144876 | A1 * | 6/2008 | Reining | H04R 1/083 381/369 |
| 2008/0252595 | A1 | 10/2008 | Boillot | |
| 2008/0292112 | A1 * | 11/2008 | Valenzuela | H04N 7/147 381/97 |
| 2009/0088964 | A1 * | 4/2009 | Schaaf | G01C 21/367 701/532 |
| 2009/0316929 | A1 * | 12/2009 | Tashev | H04B 1/036 381/94.1 |
| 2010/0123770 | A1 * | 5/2010 | Friel | H04N 7/15 348/14.08 |
| 2010/0185308 | A1 * | 7/2010 | Yoshida | H04S 7/00 700/94 |
| 2010/0296658 | A1 * | 11/2010 | Ohashi | H04S 7/305 381/57 |
| 2010/0303254 | A1 * | 12/2010 | Yoshizawa | G01S 3/8083 381/92 |
| 2011/0013075 | A1 * | 1/2011 | Kim | H04N 5/602 348/370 |
| 2011/0037777 | A1 | 2/2011 | Lindahl et al. | |
| 2011/0054890 | A1 * | 3/2011 | Ketola | G10L 21/06 704/231 |
| 2011/0075857 | A1 * | 3/2011 | Aoyagi | G01S 3/8036 381/92 |
| 2011/0075860 | A1 * | 3/2011 | Nakagawa | G01H 3/00 381/94.1 |
| 2011/0109538 | A1 * | 5/2011 | Kerr | G09G 5/36 345/156 |
| 2011/0222372 | A1 * | 9/2011 | O'Donovan | G01S 3/8083 367/103 |
| 2011/0243342 | A1 * | 10/2011 | Ohashi | H04S 7/00 381/61 |
| 2011/0275434 | A1 * | 11/2011 | Cheng | A63F 13/06 463/36 |
| 2011/0283865 | A1 * | 11/2011 | Collins | G06F 3/04817 84/464 R |
| 2012/0062729 | A1 * | 3/2012 | Hart | G06F 1/1626 348/135 |
| 2012/0128174 | A1 | 5/2012 | Tammi et al. | |
| 2012/0250869 | A1 * | 10/2012 | Ohashi | H04R 5/04 381/17 |
| 2013/0044884 | A1 | 2/2013 | Tammi et al. | |
| 2013/0177168 | A1 * | 7/2013 | Inha | H04N 5/602 381/92 |

FOREIGN PATENT DOCUMENTS

| | | | |
|---|---|---|---|
| JP | 2006-287735 A | 10/2006 | |
| JP | 2011180470 | * 9/2011 | ............ G10L 21/06 |
| JP | 2011180470 A | 9/2011 | |
| KR | 20090128187 A | 12/2009 | |
| WO | 2010075634 A1 | 7/2010 | |
| WO | 2011076286 A1 | 6/2011 | |

OTHER PUBLICATIONS

Marentakis et al., "A Study on Gestural Interaction With a 3D Audio Display", Proceedings of 6th International Symposium on Mobile Human-Computer Interaction, Sep. 13-16, 2004, 12 Pages.

Dmochowski et al., "A Generalized Steered Response Power Method for Computationally Viable Source Localization", IEEE Transactions on Audio, Speech, and Language Processing, vol. 15, No. 8, Nov. 2007, pp. 2510-2526.

Godara., "Limitations and Capabilities of Directions-Of-Arrival Estimation Techniques Using an Array of Antennas: A Mobile Communications Perspective", IEEE International Symposium on Phased Array Systems and Technology, Oct. 15-18, 1996, pp. 327-333.

Office action received for corresponding Chinese Patent Application No. 201280068276.2, dated Mar. 11, 2016, 10 pages of office action and 7 pages of office action translation available.

International Search Report received for corresponding Patent Cooperation Treaty Application No. PCT/FI2012/051149, dated Mar. 28, 2013, 6 pages.

Supplementary European Search Report received for corresponding European Patent Application No. 12852715.7, dated Jun. 29, 2015, 6 pages.

* cited by examiner

APPARATUS AND METHOD FOR AUDIO REACTIVE UI INFORMATION AND DISPLAY

RELATED APPLICATION

This application was originally filed as PCT Application No. PCT/FI2012/051149 filed Nov. 21, 2012, which claims priority to IN Application No. 4155/CHE/2011 filed on Nov. 30, 2011.

TECHNICAL FIELD

This invention relates generally to computer systems able to be coupled to or having display(s) and, more specifically, relates to creating information suitable to be viewed on the display(s).

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Sometimes it is important to know where sound comes from, in all possible situations. For example, when listening to music on a mobile device with a headset, it would still be useful to know the directions of sounds in the physical environment. In this situation, for instance, it would be useful to know the direction of a person talking behind the headset user or of a car driving closer to the headset user. Also, for people with impaired hearing, this information would be beneficial.

In mobile devices, there is never enough display space for showing different items, such as direction relative to the mobile device of a sound. Furthermore, a user may not appreciate or understand a pop up or other graphic presenting the direction but covering icons and other user interface elements displayed on the display of the mobile device. Consequently, it would be beneficial to direction information of sound using the display space provided by a mobile device.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein:

FIG. 5, including FIG. 5A illustrates user interface elements prior to modification in response to the direction of the sound, and FIG. 5B illustrates user interface elements modified to indicate the direction of the sound.

FIG. 6, including FIG. 6A illustrates user interface elements prior to modification in response to the direction of the sound, and FIGS. 6B and 6C illustrate user interface elements modified to indicate the direction of the sound.

FIG. 8, including

SUMMARY

Figure 1:
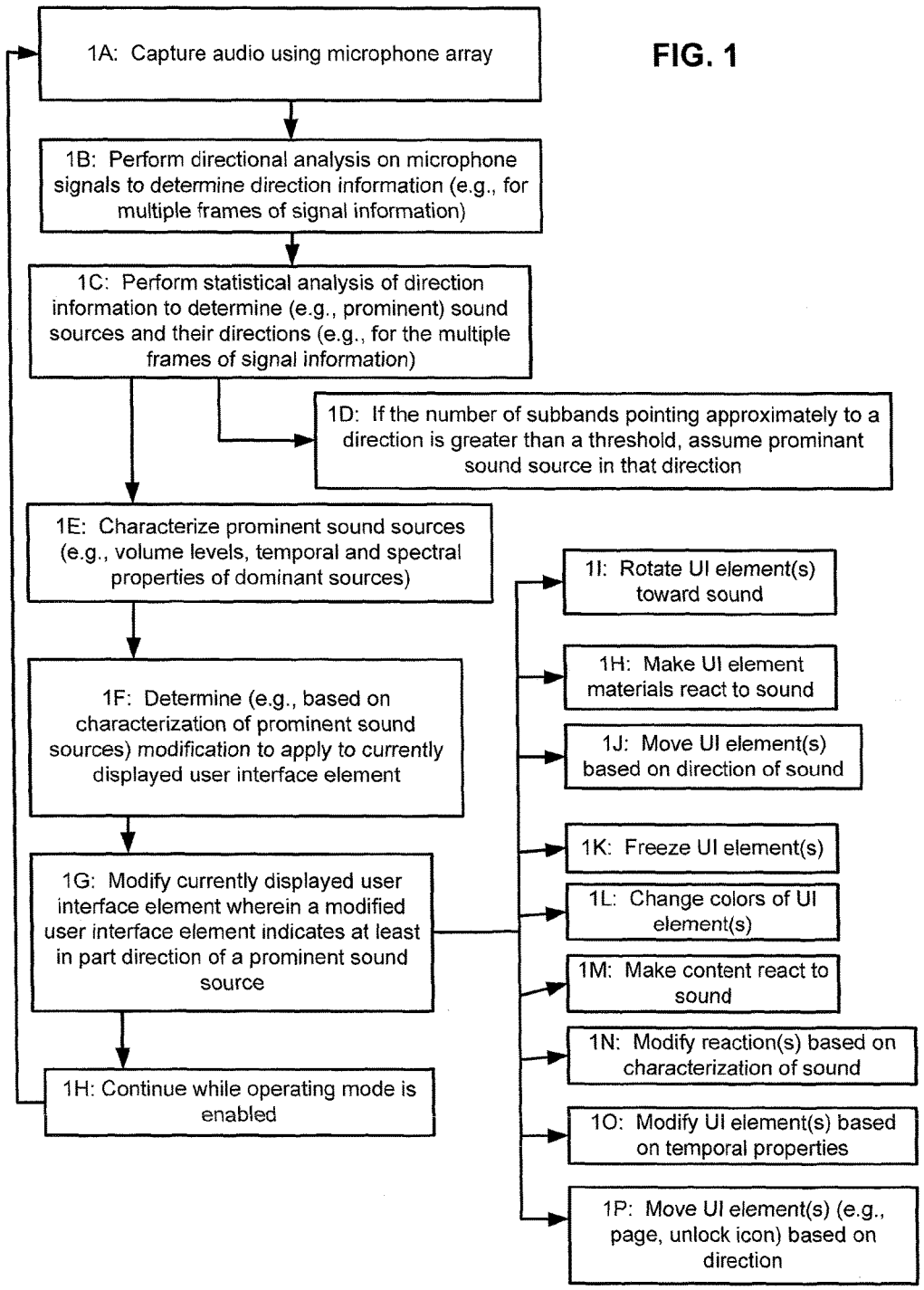
FIG. 1 is a block diagram of an exemplary method for creating an audio reactive user interface (UI).

In an exemplary embodiment, an apparatus is disclosed that includes one or more processors and one or more memories including computer program code. The one or more memories and the computer program code are configured to, with the one or more processors, cause the apparatus to perform at least the following: determining, using signals captured from two or more microphones configured to detect an acoustic signal from one or more sound sources, one or more prominent sound sources based on the one or more sound sources; determining one or more directions relative to a position of at least one of the two or more microphones for at least one of the one or more prominent sound sources; and modifying at least one user interface element displayed on a user interface of a display to provide an indication at least in part of the one or more directions, relative to position of at least one microphone, of the at least one prominent sound source.

In another exemplary embodiment, a method is disclosed that includes determining, using signals captured from two or more microphones configured to detect an acoustic signal from one or more sound sources, one or more prominent sound sources based on the one or more sound sources; determining one or more directions relative to a position of at least one of the two or more microphones for at least one of the one or more prominent sound sources; and modifying at least one user interface element displayed on a user interface of a display to provide an indication at least in part of the one or more directions, relative to position of at least one microphone, of the at least one prominent sound source.

In a further exemplary embodiment, a computer readable medium is disclosed that include computer readable code for use with a computer, the computer readable code when executed by the computer causes the computer to perform at least the following: determining, using signals captured from two or more microphones configured to detect an acoustic signal from one or more sound sources, one or more prominent sound sources based on the one or more sound sources; determining one or more directions relative to a position of at least one of the two or more microphones for at least one of the one or more prominent sound sources; and modifying at least one user interface element displayed on a user interface of a display to provide an indication at least in part of the one or more directions, relative to position of at least one microphone, of the at least one prominent sound source.

In an additional exemplary embodiment, an apparatus is disclosed that includes means for determining, using signals captured from two or more microphones configured to detect an acoustic signal from one or more sound sources, one or more prominent sound sources based on the one or more sound sources; means for determining one or more directions relative to a position of at least one of the two or more microphones for at least one of the one or more prominent sound sources; and means for modifying at least one user interface element displayed on a user interface of a display to provide an indication at least in part of the one or more directions, relative to position of at least one microphone, of the at least one prominent sound source.

DETAILED DESCRIPTION OF THE DRAWINGS

Embodiments of the instant invention relate to audio and user interfaces. More specifically, this relates to showing direction of audio around the device in a user interface by making an audio reactive UI. The embodiments may relate to 2D (two dimensional) or 3D (three-dimensional) UIs. A 3D UI is a user interface which appears three-dimensional, showing information on the display so that some UI elements are three-dimensional and/or are located in a 3D space on the display (e.g., some near, some far in depth). A user may be able to navigate also in depth but navigation can also be just 2D. A 3D user interface is implemented using 3D technology. A 3D user interface can be also used together with a 3D display, for example an autostereoscopic display, where the UI actually looks as if it is in 3D space in front of a user's eyes and/or behind the display.

In U.S. patent application Ser. No. 12/927,663, techniques were presented to capture a spatial sound field around the mobile device with required accuracy such that the directions of the main sound sources would be known. The techniques there utilize three (for instance) microphones and dedicated processing to analyze the spatial sound field around the device. As multiple microphone systems are planned for new wireless devices, this type of spatial audio capture also enables new innovative solutions also for example to the user interface or other applications in the device. These and other directional analysis of sound sources are used herein to create a UI that allows visualization of the sound in the UI.

As stated above, sometimes it is important to know where sound comes from when using, e.g., mobile devices. This type of information is not currently shown in a user interface of a mobile device but the information could be. Exemplary embodiments of the instant invention provide solutions on how to show this information. In addition, this invention provides additional entertainment value for users of the mobile device.

In particular, exemplary embodiments present direction information using the user interface elements already present on a display for a mobile device. This allows the limited display space on the mobile device to be used for directional information, without resorting to covering these user interface elements.

Exemplary embodiments are initially presented in the context of the exemplary method shown in FIG. 1. This method may be performed by computer program code, executed by one or more processors that cause a computer system such as a mobile device to perform the operations in the method. Some or all of the method may also be performed by hardware, such as an integrated circuit designed to carry out the operations. The method may also be performed by some combination of computer program code (executed by one or more processors) or hardware.

In block 1A of FIG. 1, the computer system captures audio using a microphone array. In block 1B, the computer system performs directional analysis on microphone signals to determine direction information (e.g., for multiple frames of signal information). There are techniques presented below that are able to perform directional analysis on a per-subband basis. However, the current invention is not limited to use of these techniques. Any techniques may be used that are able to determine direction of sound from multiple microphones. For instance, any of the techniques in the following documents may be used: J. P. Dmochowski, J. Benesty, S. Affes, "A Generalized Steered Response Power Method for Computationally Viable Source Localization" IEEE transactions on audio, speech, and language processing, vol. 15, no. 8, November 2007; and L. Godara, "Limitations and Capabilities of Directions-of-Arrival Estimation Techniques using an Array of Antennas: A Mobile Communications Perspective," Phased Array Systems and Technology, IEEE International Symposium (1996).

Figure 2:
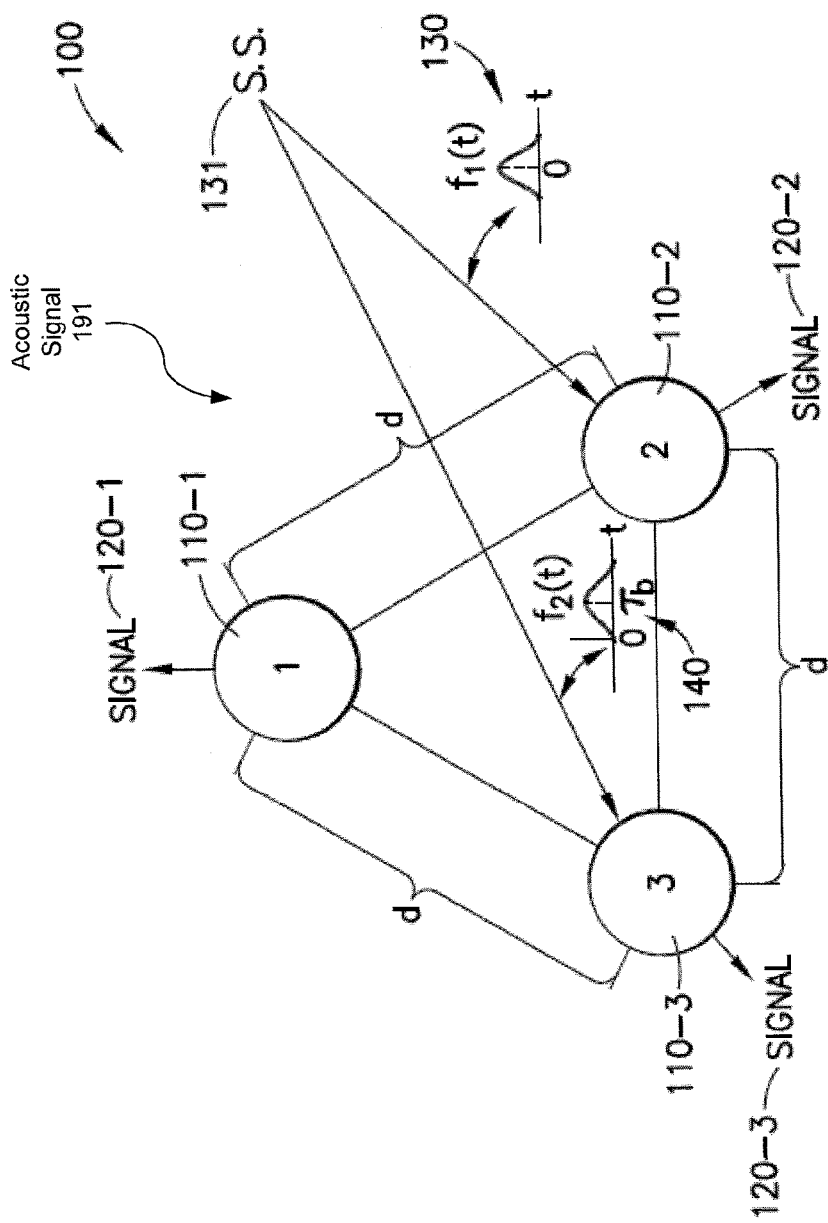
FIG. 2 shows an exemplary microphone setup using omnidirectional microphones.

Turning now to FIG. 2 (in addition to FIG. 1) and to the techniques that are able to analyze sound directions on a per-subband basis, the following techniques mainly refer to a system 100 with three microphones 110-1, 110-2, and 110-3 on a plane (e.g., horizontal level) in the geometrical shape of a triangle with vertices separated by distance, d, as illustrated in FIG. 2. However, the techniques can be easily generalized to different microphone setups and geometry. Typically, all the microphones are able to capture sound events from all directions, i.e., the microphones are omnidirectional. Each microphone 110 produces a typically analog signal 120.

In the instant techniques, the directional component of sound from several microphones is enhanced by removing time differences in each frequency band of the microphone signals.

There are many alternative methods regarding how to estimate the direction of arriving sound. In the instant description, one method is described to determine the directional information. This method has been found to be efficient. This method is merely exemplary and other methods may be used. This method is described using FIGS. 3 and 4 (referring also to FIG. 2). It is noted that the flowcharts for FIGS. 3 and 4 (and all other figures having flowcharts) may be performed by software executed by one or more processors, hardware elements (such as integrated circuits) designed to incorporate and perform one or more of the operations in the flowcharts, or some combination of these.

A straightforward direction analysis method, which is directly based on correlation between channels, is now described. The direction of arriving sound is estimated independently for B frequency domain subbands. The idea is to find the direction of the perceptually dominating sound source for every subband.

Figure 3:
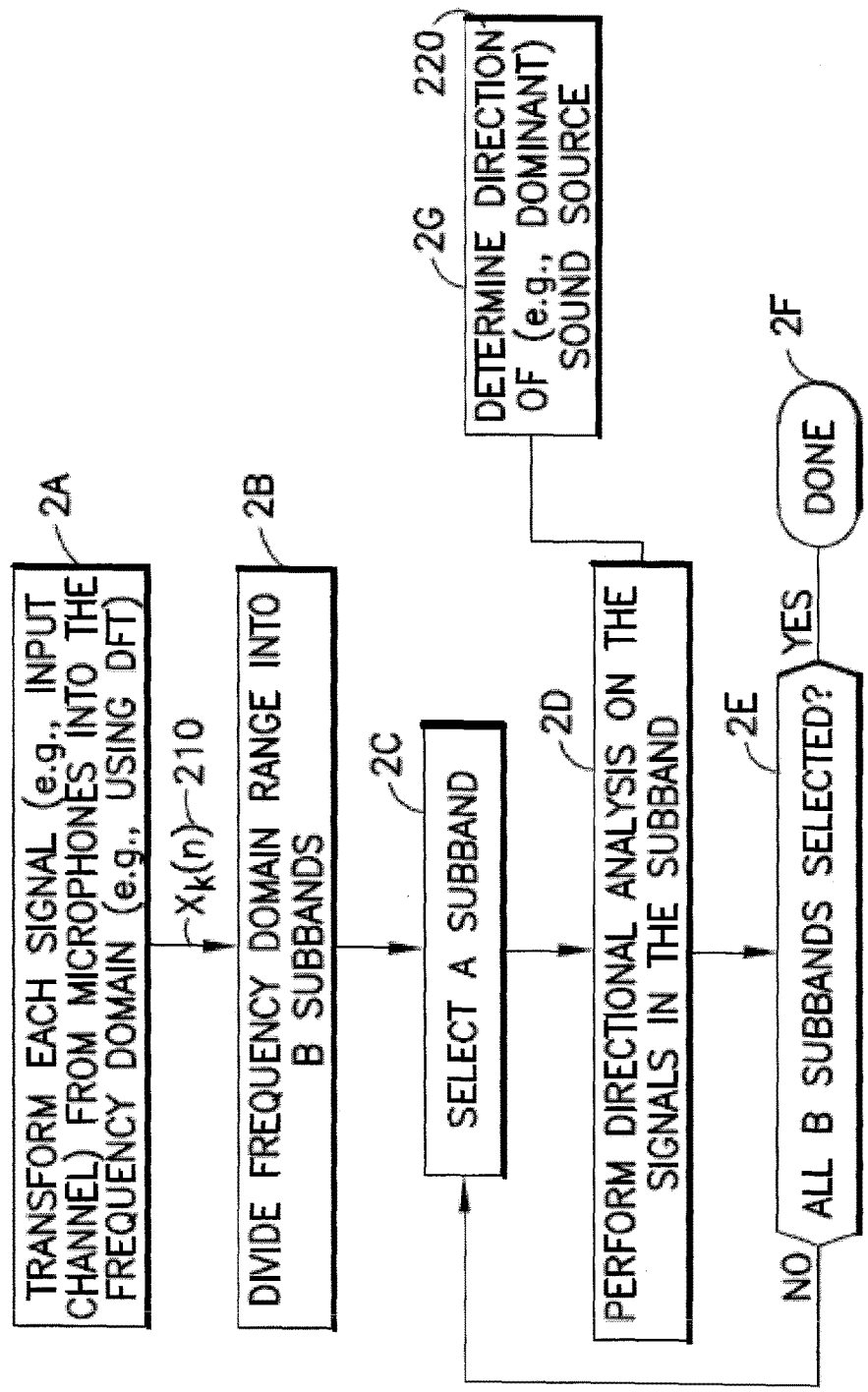
FIG. 3 is a block diagram of a flowchart for performing a directional analysis on microphone signals from multiple microphones.
Figure 4:
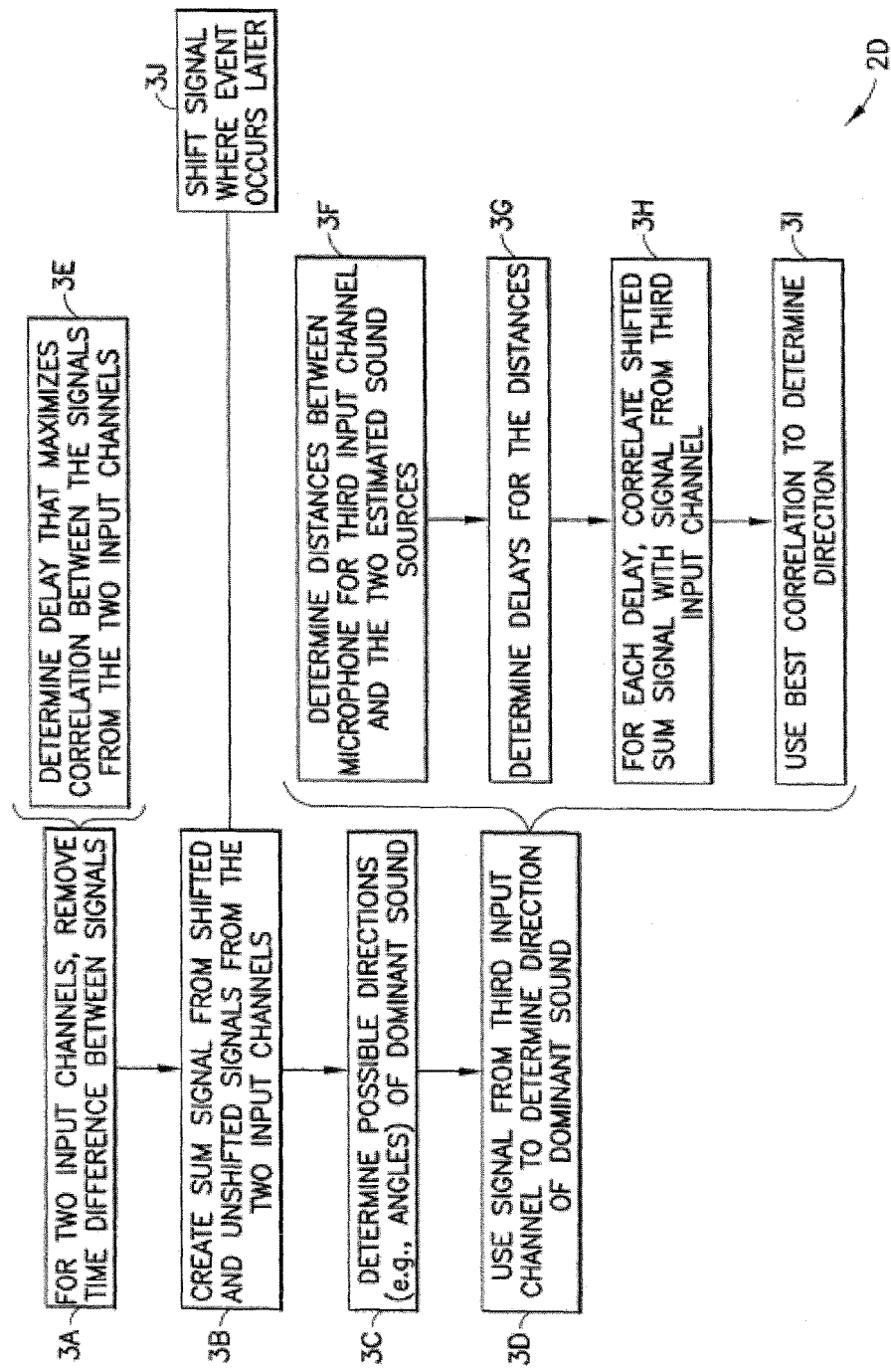
FIG. 4 is a block diagram of a flowchart for performing directional analysis on subbands for frequency-domain microphone signals.

Every input channel k=1, 2, 3 is transformed to the frequency domain using the DFT (discrete Fourier transform) (block 2A of FIG. 3). Each input channel corresponds to a signal 120-1, 120-2, 120-3 produced by a corresponding microphone 110-1, 110-2, 110-3 and is a digital version (e.g., sampled version) of the analog signal 120. In an exemplary embodiment, sinusoidal windows with 50 percent overlap and effective length of 20 ms (milliseconds) are used. Before the DFT transform is used, $D_{max}$ zeroes are added to the end of the window. $D_{max}$ corresponds to the maximum delay in samples between the microphones. In the microphone setup presented in FIG. 2, the maximum delay is obtained as $$D_{max} = \frac{dF_s}{v}, \qquad (1)$$

where $F_s$ is the sampling rate of signal and $v$ is the speed of the sound in the air. After the DFT transform, the frequency domain representation $X_k(n)$ (reference 210 in FIG. 3) results for all three channels, k=1, . . . 3, n=0, . . . , N−1. N is the total length of the window considering the sinusoidal window (length $N_s$) and the additional $D_{max}$ zeroes.

The frequency domain representation is divided into B subbands (block 2B)

$$X_k^b(n) = X_k(n_b+n), n=0, \ldots, n_{b+1}-n_b-1, b=0, \ldots, B-1, \qquad (2)$$

where $n_b$ is the first index of bth subband. The widths of the subbands can follow, for example, the ERB (equivalent rectangular bandwidth) scale.

For every subband, the directional analysis is performed as follows. In block 2C, a subband is selected. In block 2D, directional analysis is performed on the signals in the subband. Such a directional analysis determines a direction 220 ($\alpha_b$ below) of the (e.g., dominant) sound source (block 2G). Block 2D is described in more detail in FIG. 4. In block 2E, it is determined if all subbands have been selected. If not (block 2B=NO), the flowchart continues in block 2C. If so (block 2E=YES), the flowchart ends in block 2F.

More specifically, the directional analysis is performed as follows. First the direction is estimated with two input channels (in the example implementation, input channels 2 and 3). For the two input channels, the time difference between the frequency-domain signals in those channels is removed (block 3A of FIG. 4). The task is to find delay $\tau_b$ that maximizes the correlation between two channels for subband b (block 3E). The frequency domain representation of, e.g., $X_k^b(n)$ can be shifted $\tau_b$ time domain samples using $$X_{k,\tau_b}^b(n) = X_k^b(n) e^{-j\frac{2\pi n \tau_b}{N}}. \qquad (3)$$

Now the optimal delay is obtained (block 3E) from $$\max_{\tau_b} Re(\Sigma_{n=0}^{n_{b+1}-n_b-1} (X_{2,\tau_b}^b(n)^* X_3^b(n))), \tau_b \in [-D_{max}, D_{max}] \qquad (4)$$

where Re indicates the real part of the result and * denotes complex conjugate. $X_{2,\tau_b}^b$ and $X_3^b$ are considered vectors with length of $n_{b+1}-n_b-1$ samples. Resolution of one sample is generally suitable for the search of the delay. Also other perceptually motivated similarity measures than correlation can be used. With the delay information, a sum signal is created (block 3B). It is constructed using following logic $$X_{sum}^b = \begin{cases} (X_{2,\tau_b}^b + X_3^b)/2 & \tau_b \leq 0 \\ (X_2^b + X_{3,-\tau_b}^b)/2 & \tau_b > 0 \end{cases}, \qquad (5)$$

where $\tau_b$ is the $\tau_b$ determined in Equation (4).

In the sum signal the content (i.e., frequency-domain signal) of the channel in which an event occurs first is added as such, whereas the content (i.e., frequency-domain signal) of the channel in which the event occurs later is shifted to obtain the best match (block 3J).

Turning briefly again to FIG. 2, a simple illustration helps to describe in broad, non-limiting terms, the shift $\tau_b$ and its operation above in equation (5). A sound source (S.S.) 131 creates an acoustic signal 191 that creates an event described by the exemplary time-domain function $f_1(t)$ 130 received at microphone 2, 110-2. That is, the signal 120-2 would have some resemblance to the time-domain function $f_1(t)$ 130. Similarly, the same event, when received by microphone 3, 110-3 is described by the exemplary time-domain function $f_2(t)$ 140. It can be seen that the microphone 3, 110-3 receives a shifted version of $f_1(t)$ 130. In other words, in an ideal scenario, the function $f_2(t)$ 140 is simply a shifted version of the function $f_1(t)$ 130, where $f_2(t)=f_1(t-\tau_b)$. Thus, in one aspect, this exemplary embodiment for determining directions of sound sources removes a time difference between when an occurrence of an event occurs at one microphone (e.g., microphone 3, 110-3) relative to when an occurrence of the event occurs at another microphone (e.g., microphone 2, 110-2). This situation is described as ideal because in reality the two microphones will likely experience different environments, their recording of the event could be influenced by constructive or destructive interference or elements that block or enhance sound from the event, etc. The acoustic signal 191 would be received at all three microphones 110, and if there are multiple sound sources 131, the acoustic signal 191 would be representative of the multiple sound sources 131. An acoustic signal 191 could comprise one or more sound sources in the environment. An acoustic signal 191 can represent the sound field around the device and can therefore comprise the sound waves generated by one or more sound sources etc., and may comprise one or more audible frequency components.

The shift $\tau_b$ indicates how much closer the sound source is to microphone 2, 110-2 than microphone 3, 110-3 (when $\tau_b$ is positive, the sound source is closer to microphone 2 than microphone 3). The actual difference in distance can be calculated as $$\Delta_{23} = \frac{v\tau_b}{F_s}. \qquad (6)$$

Utilizing basic geometry on the setup in FIG. 2, it can be determined that the angle of the arriving sound is equal to (returning to FIG. 4, this corresponds to block 3C)

$$\alpha_b = \pm \cos^{-1}\left(\frac{\Delta_{23}^2 + 2b\Delta_{23} - d^2}{2db}\right), \qquad (7)$$

where d is the distance between microphones and b is the estimated distance between sound sources and nearest microphone. Typically b can be set to a fixed value. For example b=2 meters has been found to provide stable results. Notice that there are two alternatives for the direction of the arriving sound as the exact direction cannot be determined with only two microphones.

The third microphone is utilized to define which of the signs in equation (7) is correct (block 3D). An example of a technique for performing block 3D is as described in reference to blocks 3F to 3I. The distances between microphone 1 and the two estimated sound sources are the following (block 3F):

$$\delta_b^+ = \sqrt{(h+b\sin(\dot{\alpha}_b))^2 + (d/2 + b\cos(\dot{\alpha}_b))^2}$$

$$\delta_b^- = \sqrt{(h-b\sin(\dot{\alpha}_b))^2 + (d/2+b\cos(\dot{\alpha}_b))^2}, \quad (8)$$

where h is the height of the equilateral triangle, i.e.

$$h = \frac{\sqrt{3}}{2}d. \quad (9)$$

The distances in equation (8) equal to delays (in samples) (block 3G)

$$\tau_b^+ = \frac{\delta^+ - b}{v} F_S \quad (10)$$
$$\tau_b^- = \frac{\delta^- - b}{v} F_S.$$

Out of these two delays, the one is selected that provides better correlation with the sum signal. The correlations are obtained as (block 3H)

$$c_b^+ = \mathrm{Re}\left( \sum_{n=0}^{n_{b+1}-n_b-1} \left( X_{sum,\tau_b^+}^b(n)^* X_1^b(n) \right) \right) \quad (11)$$

$$c_b^- = \mathrm{Re}\left( \sum_{n=0}^{n_{b+1}-n_b-1} \left( X_{sum,\tau_b^-}^b(n)^* X_1^b(n) \right) \right).$$

Now the direction is obtained of the dominant sound source for subband b (block 3I):

$$\alpha_b = \begin{cases} \dot{\alpha}_b & c_b^+ \geq c_b^- \\ -\dot{\alpha}_b & c_b^+ < c_b^- \end{cases}. \quad (12)$$

The same estimation is repeated for every subband (e.g., as described above in reference to FIG. 3).

After the directional analysis, we now have estimates for the dominant sound source for every subband b. Directional information still needs some additional processing, i.e., one individual subband in one frame pointing to some particular direction should not cause any visible output to the display, but when there is a group of subbands pointing to approximately to the same direction then that particular direction "activates" in the display.

In the spatial analysis, the information of the sound source directions is updated at frequent intervals, for example every 20 ms (milliseconds) for multiple frames of microphone signal information. For every update instant and for every frequency domain subband b, the parameter $\alpha_b$ (in certain embodiments) describes the direction of the main sound source for that particular subband. Before further processing, statistical analysis is performed. Thus, returning to FIG. 1, in block 1C, the computer system performs statistical analysis of the direction information to determine (e.g., prominent) sound sources (e.g., for the multiple frames of signal information) and the direction of those prominent sound sources relative to the computer system. That is, there may be multiple possible sound sources in a sound field, but in an exemplary embodiment only some of those will be deemed to be prominent sound sources.

First of all, it is reasonable to perform the statistical analysis for example five times in a second, thus several frames of data can be analyzed together. For instance, 10 frames may be used, each of which is 20 ms long. In addition, it is reasonable to remove from the data set the directions in which there are only rare occurrences. Sources from the approximately same direction are grouped into one group. A criterion of a certain threshold should be exceeded before a sound source is estimated to exist (block 1D of FIG. 1). As a result of the analysis, the directions of the prominent sound sources around the device are detected.

In block 1E, the computer system characterizes the prominent sound sources. That is, the prominent sound sources may be characterized based on, e.g., volume levels and temporal and spectral properties of dominant sources, through known techniques.

It is noted that block 1C can limit the number of sound sources that are selected as prominent based on one or more criteria. For instance, only those sounds sources might be selected as prominent that are greater than (or less than) an estimated strength, are above (or below) a frequency (e.g., or are within a frequency range), or whether a sound source is continuous (or is discontinuous). Processing power is another possible criterion. For example, if 10 sound sources are found in block 1B, it may take too much estimated processing power (above a threshold) to track all of these, and only a number of sound sources are selected as prominent so that the estimated processing power is below the threshold. In another example, the estimated power usage, e.g., in order to modify user interface elements may be greater than a threshold, and therefore only certain sound sources are selected as prominent in order to reduce the estimated power usage to below the threshold. As a further example, there may be a set number of sound sources that are to be used to modify user interface elements displayed on the display. For instance, a user may set a maximum number of sound sources. Only that number or fewer sound sources will be used to modify displayed user interface elements. These criteria may be combined.

In block 1F, the computer system determines (e.g., based on characterization of dominant sound sources) a modification to apply to currently displayed user interface element(s). A user interface element is any element suitable for display in a user interface. For instance, user interface elements may include one or more of an icon on the user interface, text on the user interface, a background of the user interface, a photograph on the user interface, content on the user interface, or a page of the user interface. In block 1G, the computer system modifies a currently displayed user interface element (e.g., or modifies information, such as a set of memory locations, corresponding to a user interface element for display), wherein a modified user interface element indicates at least in part direction of a sound source. Blocks 1F and 1G may operate on multiple user interface elements. Thus, blocks 1F and 1G may cause UI elements to react to some or all sounds in a certain way, or with some defined sounds in defined way, and all the possible variants in between. For example, UI elements can be made to react differently to louder and quieter sounds and react differently to familiar and new sounds and so on.

Some examples of block 1G are as follows:

1) Icons on the display turn (e.g., rotate) "toward" the sound (see FIGS. 6B, 6C, 8B, 8C). See block 1I, where one or more UI elements are rotated "toward" the sound.

Figures 5A, 5B:
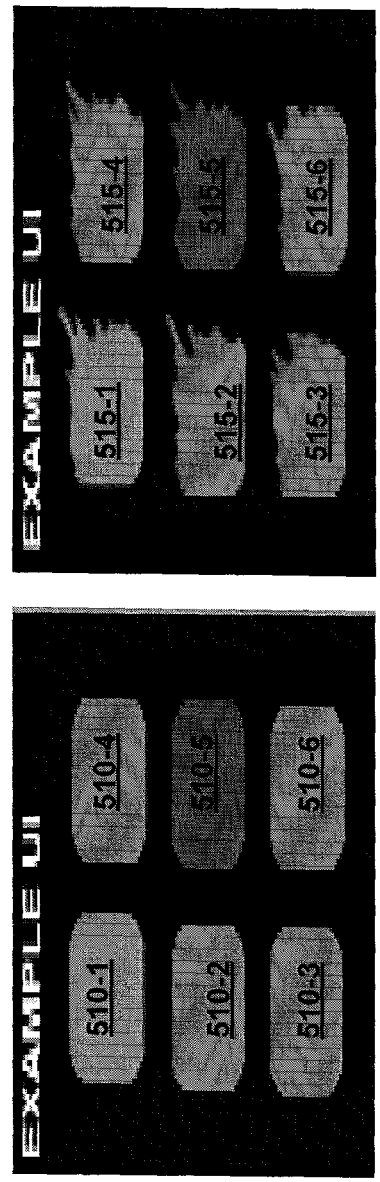
FIGS. 5A and 5B, illustrates a UI where user interface elements (e.g., icons) react to directional sound as if the sound was wind coming from that direction, where

2) Icon materials are made react to the sound, for example, as if the sound was wind from the direction of audio (for example hair-like material in 3D icons reacts to wind in realistic way; see FIG. 5B, or icons are continuously "blown" into a corner/along a side opposite from where the sound originates). See block 1H, where a UI element(s) is made to react to the sound.

3) Icons "get scared of" certain sounds (such as voices) and appear to "jump" to opposite corners in the UI (see FIG. 7) (where "opposite" is relative to the direction of a sound source). The icons could also move toward the sound. See block 1J, where UI element(s) are moved based on direction of a sound.

4) Icons appear frozen (block 1K) in the corner where loud sounds (or any other sound the icon is programmed to be "scared of") are coming from. For instance, if an icon normally has an appearance of a liquid 3D item, when the icon "gets scared", the icon gets frozen, that is, becomes ice-like.

5) Colors of the UI elements such as icons, text, and backgrounds can vary (e.g., in a gradient) based on the direction of sound, for example getting much brighter in the side/corner of the direction of the sound and darker in areas away from the sound. See block 1L.

6) Photos or videos or basically any content displayed as part of a UI may be made to react to sound directions too (block 1M), for example by changing colors or reacting in a certain animated way.

7) In addition to the direction of the sound, the reaction of the UI elements can be based on characteristic of the sound, such as the temporal and/or spectral characteristics of the sound source. For instance, low-frequency content of the sound can change the background color to a darker shade, whereas the predominantly high-frequency content from the same direction can make the background color brighter. As another example, higher frequency may cause faster movement away from a direction of sound. See block 1N.

8) In an alternative embodiment, a sound such as a finger snap or click, the behavior of the UI elements could be made more or less reactive as compared to sounds of longer duration such as whistles or wind blowing or speech. For instance, for a signal generated by the user such as a finger snap, an icon might move in the direction of the sound source, and in further embodiments, such icon can "bounce" back to the original location of the icon. By contrast, for a longer duration sound, such as a consistent wind, an icon might move in the same direction of the sound is moving, and in further embodiments, the icon would stay in a corner/along a side of the display (opposite the direction of the sound source), perhaps slightly bouncing off the corner/side but then being forced back to the corner/along the side. See block 1O.

9) In another alternative embodiment, a user interface element that is a page may be made to move away from (or toward, depending on configuration) a sound source. Illustratively, a user could clap at the "left" side of a mobile device, the page currently on the UI would move toward the "right" side of the mobile device and off the display, and another page would move from the "left" side (off the display) and onto the display. This operation is similar to the operation currently performed for many users when they "swipe" a touch screen to move one page off the display (the touch screen) and move another page onto the touch screen. This embodiment could also be used, e.g., for unlocking a device, as many touch screen devices use a feature where a user "slides" an icon across a surface of a device from a starting point to an ending point to unlock the device. The instant embodiment could perform this function by reacting to sound. See block 1P.

In terms of exemplary implementations for block 1G, the implementations depend on the user interface element being modified, the type of modification being performed, and may also depend on the operating system (e.g., UI engine) being used. For instance, icons are typically stored in the portable network graphics (PNG) or the scalable vector graphics (SVG) format in memory. The most convenient way to rotate icons would be through the application programmer interface (API) given by the underlying UI engine. Such UI engines include QT (a cross-platform application and UI framework), Microsoft foundation class (MFC), WxWidgets (a cross-platform graphical user interface and tools library for GTK, which is a toolkit for creating a UI, Microsoft Windows, and Macintosh operating systems), and the like. Most of the UI engines would probably provide the ability to rotate 0-90-180-270 degrees. But it should be easy for the engine to allow for finer resolution, such as at 15-20 degrees. Other UI engines allow icons and other UI elements to be freely rotated.

In block 1H, the process continues while an operating mode of the audio reactive UI function is enabled (e.g., while the operating mode is not disabled).

Turning to FIG. 5, including FIGS. 5A and 5B, this figure illustrates a UI where user interface elements (e.g., icons) react to directional sound as if the sound was wind coming from that direction. FIG. 5A illustrates user interface elements 510-1 through 510-6 prior to modification in response to the direction of the sound. FIG. 5B illustrates user interface elements 515-1 through 515-6 after modification to indicate the direction 520 of the sound source 593. That is, the original icons 510 are modified to create modified icons 515. In this example, there is hair-like material toward the right side of the icons 515, and the hair-like material is made to move as if wind were blowing hair-like material in direction 520. As direction 520 changes, so could the direction of the hair-like material. In this example, the hair-like material provides an indication of the direction 520.

Figure 6B:
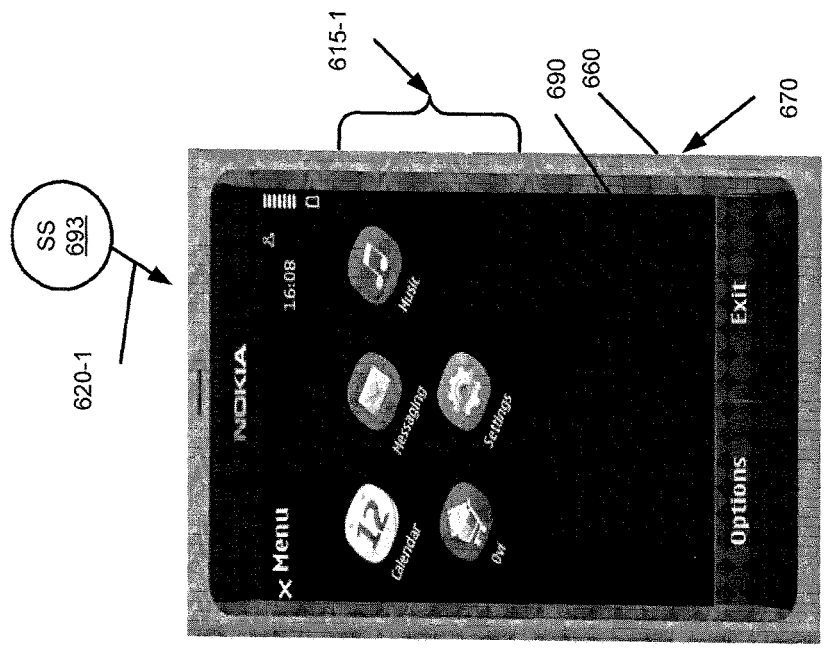
FIGS. 6A, 6B, and 6C, illustrates a UI where rotation of user interface elements (e.g., icons) is performed based on the sound source direction, where
Figure 6A:
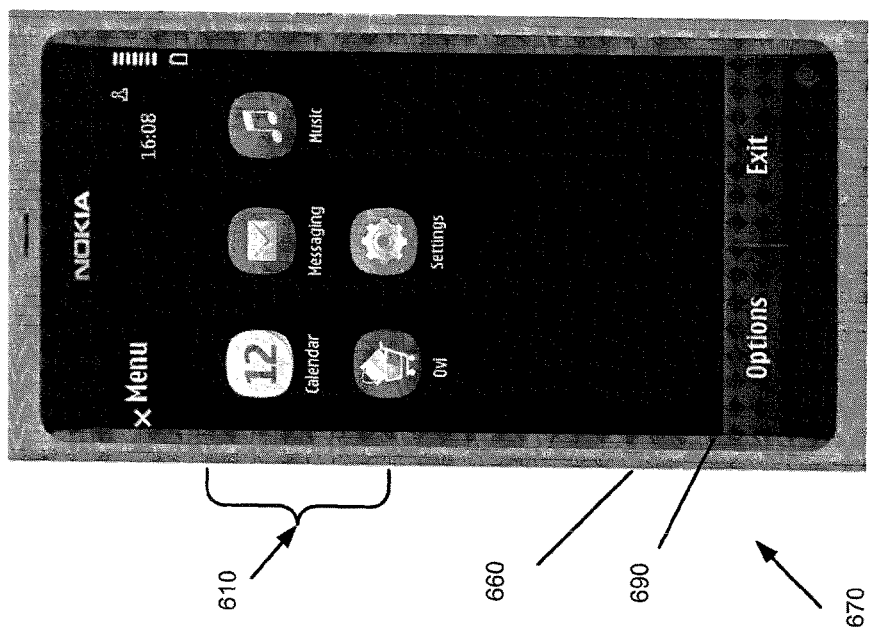
Figure 6C:
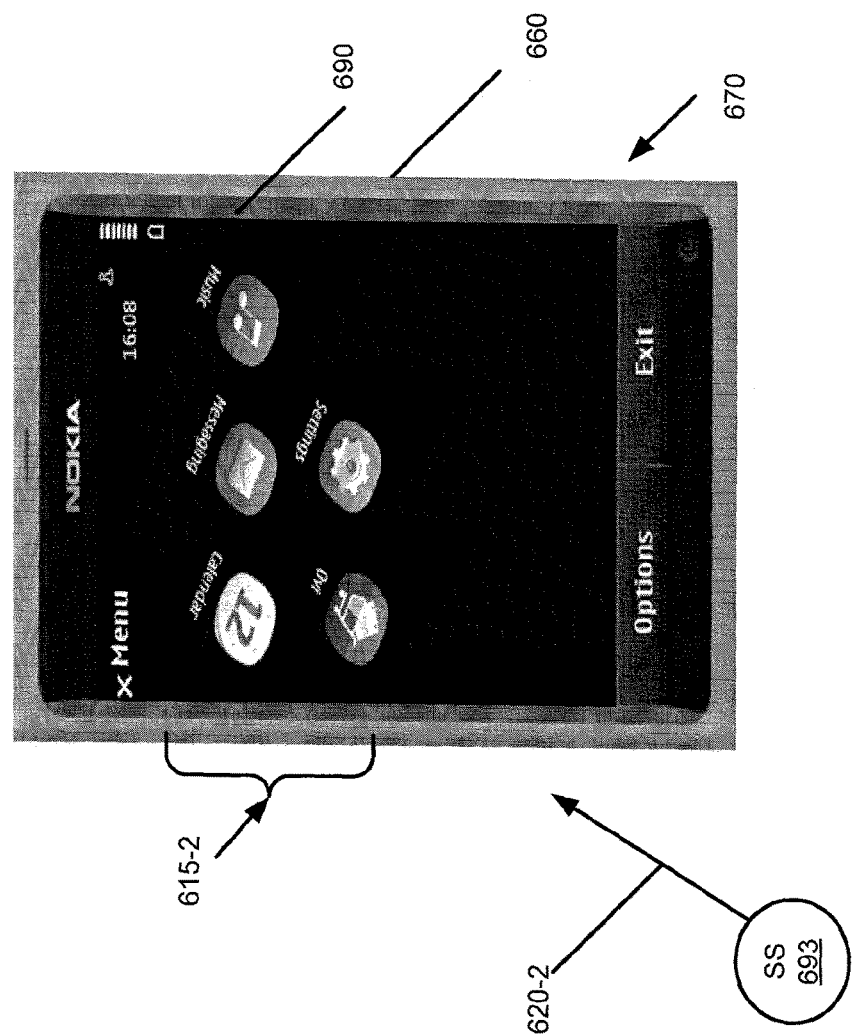

Referring to FIG. 6, including FIGS. 6A, 6B, and 6C, this figure illustrates a UI where rotation of user interface elements (e.g., icons) is performed based on the sound source direction. FIG. 6A illustrates user interface elements 610 (e.g., icons in this example) prior to modification in response to the direction of a sound. The mobile device 660 is shown, as it its UE 670, on display 690. FIG. 6B illustrates user interface elements 615-1 modified to indicate the direction 620-1 of the sound source 693. That is, user interface elements 615-1 are modified versions of the corresponding user interface elements 610, and are modified to at least indicate the direction 620-1 of the sound. FIG. 6C illustrates user interface elements 615-1 modified to indicate the direction 620-2 of the sound source 693. User interface elements 615-2 are modified versions of the corresponding user interface elements 610, and are modified to at least indicate the direction 620-2 of the sound.

Figure 7:
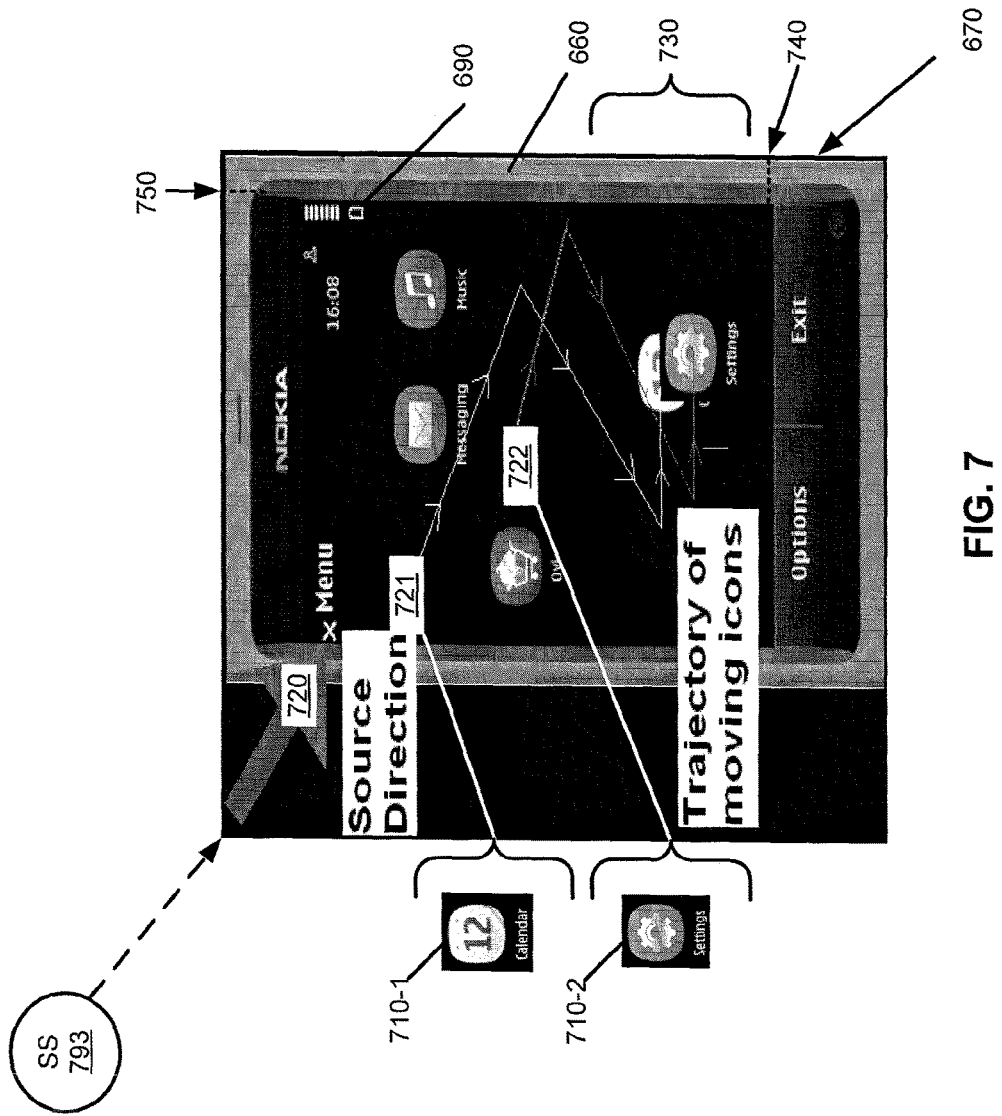
FIG. 7 illustrates user interface elements (e.g., icons) being modified such as to move as a function of source direction.

FIG. 7 illustrates user interface elements (e.g., icons) being modified such as to move as a function of source direction. In this example, the icons 710-1 and 710-2 start at locations 721 and 722, respectively. Each icon moves along a corresponding trajectory shown, and initially "away" from the direction 720 of the sound source 793. At side 750 of the UI 670 (e.g., the side of the display 690), the icons 710-1 and 710-2 "bounce" off the side 750 in a different path (as part of the overall trajectory), but then are slowed down and rerouted again away from direction 720. Near the bottom 730 of the UI 670, the icons 710-1 and 720-2 "slide" along the bottom 740 of an effective UI area (i.e., the icons 710-1 and 710-1 are not allowed to enter the "Options" and "Exit" areas). The icons 710-1 and 710-2 may remain in the bottom right corner of the UE 670 (e.g., until the sound source 793 changes direction 720 or perhaps goes away).

Figure 8C:
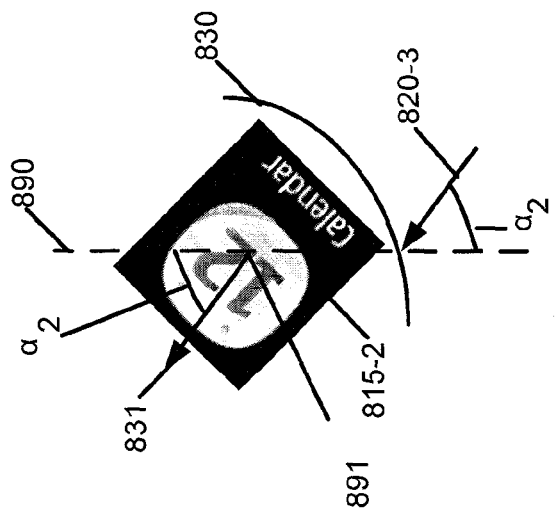
FIGS. 8A, 8B, and 8C, illustrate how an icon might be modified in real-time to indicate directions of sound as the sound moves relative to the mobile device.
Figure 8B:
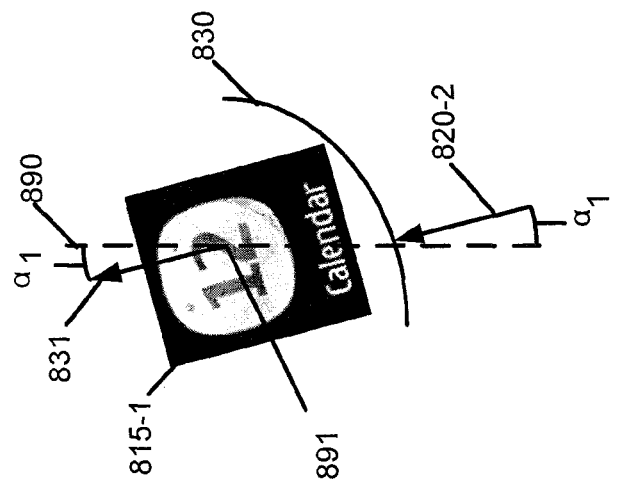
Figure 8A:
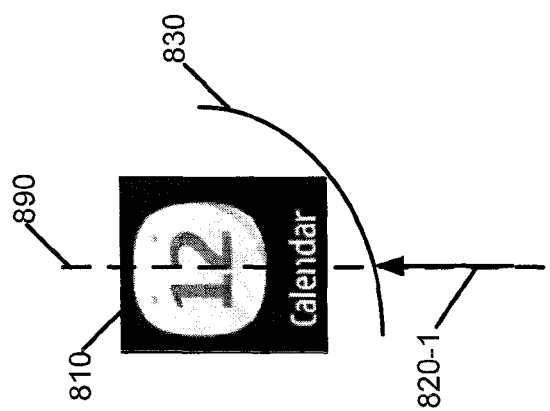

Referring to FIG. 8, including FIGS. 8A, 8B, and 8C, this figure illustrates how an icon might be modified in real-time to indicate directions of sound as the sound moves relative to the mobile device. In FIG. 8A, the direction 820-1 is at zero degrees relative to the axis 890 bisecting the icon 810 (and assume the axis 890 is parallel to an axis bisecting the mobile device, not shown in FIG. 8). In FIG. 8B, the direction of a sound source has changed to direction 820-2 (at an angle $\alpha_1$ relative to the axis 890), and the computer system has modified the icon 810-1 to create icon 815-1, which is shown rotated the angle $\alpha_1$ about a center point 891, along an arc 830. An axis 831 of the icon 815-1 is modified to be approximately parallel to direction 820-2. In FIG. 8C, the direction of the sound source has changed to direction 820-3 (at an angle $\alpha_2$ relative to the axis 890), and the computer system has modified the icon 810-1 to create icon 815-2, which is shown rotated an angle $\alpha_2$ about a center point 891, along the arc 830. An axis 831 of the icon 815-2 is modified to be approximately parallel to direction 820-3. The icons 810/815 can in this manner be made to smoothly move about center point 891 in real-time, as the sound source moves.

Figure 9:
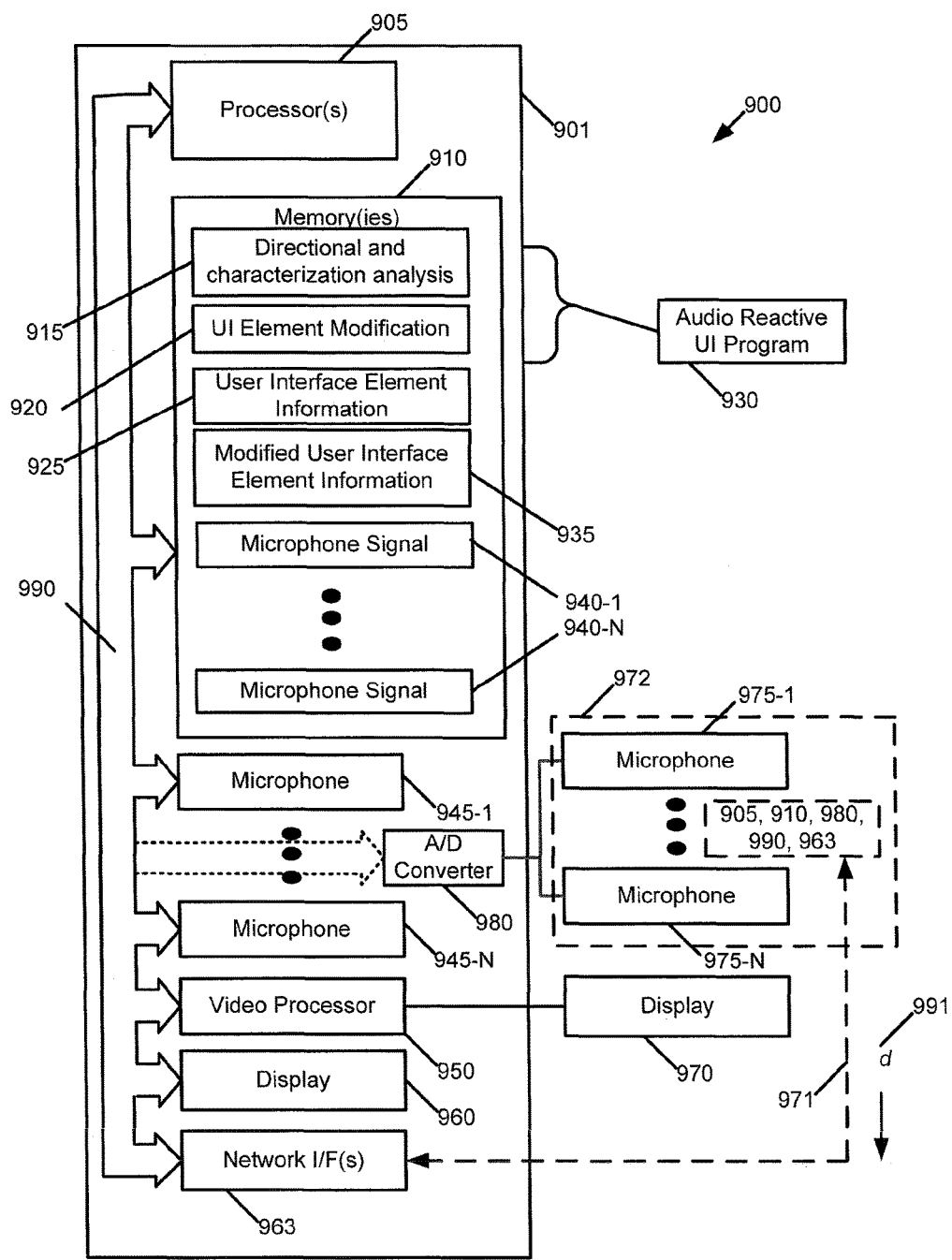
FIG. 9 shows a block diagram of an exemplary system including a mobile device suitable for practicing the exemplary embodiments of the instant invention.

Turning to FIG. 9, this figure shows a block diagram of an exemplary system 900 including a mobile device 901 suitable for practicing the exemplary embodiments of the instant invention. The mobile device 901 is an example of a computer system. System 900 as shown has multiple configurations, some of which typically might not be used at the same time but are included to illustrate multiple examples. System 900 includes a mobile device 901 comprising one or more processors 905, one or more memories 910, N microphones 945-1 through 945-N (where N is two or greater), an analog-to-digital (A/D) converter 980, a video processor 950, a display 960, and one or more network interfaces (I/F(s)) 963, interconnected through one or more buses 890. The one or more memories 910 include a directional and characterization analysis module 915, a UI element modification module 920, UI element information 925, modified UI element information 935, and N microphone signals 940-1 through 940-N (e.g., a digital representation of the microphone signals 120 of FIG. 2). The system 900 may also include N microphones 975 and display 970, each of which is external to the mobile device 901. The one or more network interfaces 963 are wired, wireless, or both network interfaces.

In one exemplary embodiment, the directional and characterization analysis module 915 accesses the microphone signals 940 and performs one or more of the techniques presented above to determine directions, relative to a location of the mobile device 901, of sound sources 131 (see FIG. 2 for 131; see blocks 1B, 1C, and 1D for determining directions). The directional and characterization analysis module 915 may also characterize the sound sources as described above in reference to block 1E. The UI element modification module 920 performs blocks 1F and 1G described above and acts on the UI element information 925 (i.e., currently presented on the display 960/970) to determine corresponding modified UI element information 935, which will replace the UI element information 925 on the display 960/970. The modules 915 and 920 may be combined or further subdivided and are presented herein for ease of exposition. In an exemplary embodiment, for instance, the modules 915 and 920 make up an audio reactive UI program 930.

It is also noted that the video processor 950 may have its own memory 910, and the information 925 or 935 or both may reside completely within the memory 910 of the video processor 950.

The microphones 975 are external to the mobile device 901 and may be used as previously described and in lieu of the internal microphones 945. There may also be some combinations of microphones 945, 975 used to create a suitable number of microphones. For instance, the mobile device may only have one internal microphone 945, but may use two external microphones 975. The A/D converter 980 may be used with either of the internal microphones 945 or the external microphones 975 to convert analog microphone signals into digital microphone signals. The directions determined would be relative to one or more of the microphones 857, if these microphones are used in lieu of microphones 845.

The display 970 is in addition to or lieu of display 960. For instance, one could use a mobile device 901 providing an external HDMI (high definition multimedia interface) connection (via video processor 950) to a display 970, and the visual effects 510 could be presented on one or both displays 960/970.

Another possibility is also illustrated in FIG. 9. In this example, the microphones 975 may be part of another device 972, such as another computer system or mobile device. The device 972 may comprise one or more processors 905, one or more memories 910 and one or more A/D converters 980, one or more buses 990, and one or more network interfaces 963. The device 972 may perform certain processing and send certain information based on the processing to the mobile device 901. For instance, the device 972 could create digital microphone signals 940 and send the signals 940 to the mobile device 901 via one or more network links 971. The device 972 could further perform directional analysis, using directional analysis module 915 in memories 910, on the microphone signals 940 to determine directions (d, 991) of sound sources, and send the directions to the mobile device 901 via the one or more network links 971. It is noted that the determined directions would be relative to a location of the device 972.

A number of examples are now described. In one example, an apparatus includes one or more processors and one or more memories including computer program code. The one or more memories and the computer program code are configured to, with the one or more processors, cause the apparatus to perform at least the following: determining, using signals captured from two or more microphones configured to detect an acoustic signal from one or more sound sources, one or more prominent sound sources based on the one or more sound sources; determining one or more directions relative to a position of at least one of the two or more microphones for at least one of the one or more prominent sound sources; and modifying at least one user interface element displayed on a user interface of a display to provide an indication at least in part of the one or more directions, relative to position of at least one microphone, of the at least one prominent sound source.

In other exemplary embodiments, the modifying further comprises rotating the at least one user interface element on the user interface wherein the rotated at least one user interface element indicates the direction of the at least one prominent sound source. The rotating, in an exemplary embodiment, further comprises rotating the at least one user interface element by rotating an axis of the at least one user interface element approximately parallel to the direction of the at least one prominent sound source.

The modifying may also comprise modifying the at least one user interface element by moving the at least one user interface element on the user interface a second direction away from the direction of the at least one prominent sound source. The moving may further comprise moving the at least one user interface element on the user interface on a trajectory that is at least in part along the second direction.

The modifying may also further comprise modifying the at least one user interface element wherein the at least one user interface element is made to appear to react to a sound of the at least one prominent sound source.

The modifying may further comprise modifying one or more colors of the at least one user interface element based on the direction of the at least one prominent sound source.

The apparatus of any of the preceding paragraphs may also include wherein the at least one user interface element comprises at least one of an icon on the user interface, text on the user interface, a background of the user interface, a photograph on the user interface, content on the user interface, or a page of the user interface.

The apparatus may also include wherein the at least one user interface element comprises a page of the user interface on the display, and wherein modifying further comprises moving, responsive to the direction, the page of the user interface off the display and moving a different page of the user interface onto the display. The apparatus may also include wherein the at least one user interface element including an unlock icon of the user interface on the display, and wherein modifying further comprises moving, responsive to the direction, the unlock icon from an initial position to an end position.

In another exemplary embodiment, a computer readable medium is disclosed that includes computer readable code for use with a computer. The computer readable code when executed by the computer causes the computer to perform at least the following: determining, using signals captured from two or more microphones configured to detect an acoustic signal from one or more sound sources, one or more prominent sound sources based on the one or more sound sources; determining one or more directions relative to a position of at least one of the two or more microphones for at least one of the one or more prominent sound sources; and modifying at least one user interface element displayed on a user interface of a display to provide an indication at least in part of the one or more directions, relative to position of at least one microphone, of the at least one prominent sound source.

In an additional exemplary embodiment, an apparatus is disclosed that includes the following: means for determining, using signals captured from two or more microphones configured to detect an acoustic signal from one or more sound sources, one or more prominent sound sources based on the one or more sound sources; means for determining one or more directions relative to a position of at least one of the two or more microphones for at least one of the one or more prominent sound sources; and means for modifying at least one user interface element displayed on a user interface of a display to provide an indication at least in part of the one or more directions, relative to position of at least one microphone, of the at least one prominent sound source.

In a further exemplary embodiment, a method is disclosed that includes: determining, using signals captured from two or more microphones configured to detect an acoustic signal from one or more sound sources, one or more prominent sound sources based on the one or more sound sources; determining one or more directions relative to a position of at least one of the two or more microphones for at least one of the one or more prominent sound sources; and modifying at least one user interface element displayed on a user interface of a display to provide an indication at least in part of the one or more directions, relative to position of at least one microphone, of the at least one prominent sound source.

The modifying may further comprise rotating the at least one user interface element on the user interface wherein the rotated at least one user interface element indicates the direction of the at least one prominent sound source. The rotating may further include rotating the at least one user interface element by rotating an axis of the at least one user interface element approximately parallel to the direction of the at least one prominent sound source.

The modifying may also include modifying the at least one user interface element by moving the at least one user interface element on the user interface a second direction away from the direction of the at least one prominent sound source. The moving may further comprises moving the at least one user interface element on the user interface on a trajectory that is at least in part along the second direction.

The modifying may additionally comprise modifying the at least one user interface element wherein the at least one user interface element is made to appear to react to a sound of the at least one prominent sound source.

The modifying may further comprise modifying one or more colors of the at least one user interface element based on the direction of the at least one prominent sound source.

The method of any of the previous paragraphs, where at least one user interface element may comprise at least one of an icon on the user interface, text on the user interface, a background of the user interface, a photograph on the user interface, content on the user interface, or a page of the user interface.

The method may also include wherein the at least one user interface element comprises a page of the user interface on the display, and wherein modifying further comprises moving, responsive to the direction, the page of the user interface off the display and moving a different page of the user interface onto the display.

The method may also include wherein the at least one user interface element comprises an unlock icon of the user interface on the display, and wherein modifying further comprises moving, responsive to the direction, the unlock icon from an initial position to an end position.

Without in any way limiting the scope, interpretation, or application of the claims appearing below, a technical effect of one or more of the example embodiments disclosed herein is to provide directional information using user interface elements already shown on a UI of a display.

Embodiments of the present invention may be implemented in software, hardware, application logic or a combination of software, hardware and application logic. In an exemplary embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with examples of computers described and depicted. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

We claim:

1. An apparatus, comprising: one or more processors; and one or more memories including computer program code, the one or more memories and the computer program code configured to, with the one or more processors, cause the apparatus to:

determine, using signals captured from two or more microphones configured to detect an acoustic signal from one or more prominent sound sources, one or more directions of the one or more prominent sound sources relative to a position of at least one of the two or more microphones, wherein the apparatus comprises the at least one of the two or more microphones, where locations of the two or more microphones are predetermined inside the apparatus;

present at least one displayed user interface element that is to receive a modification to provide directional information of the one or more prominent sound sources, wherein the at least one displayed user interface element is presented for at least one purpose independent of the one or more prominent sound sources; and modify the at least one displayed user interface element dependent on the one or more determined directions while the two or more microphones are capturing the acoustic signal, wherein the at least one displayed user interface element is modified on a display of the apparatus to provide an indication at least in part of the one or more determined directions of the one or more prominent sound sources so that a relative position of the one or more prominent sound sources to the apparatus is indicated from the modified at least one displayed user interface element while the two or more microphones are capturing the acoustic signal.

2. The apparatus of claim 1, wherein the one or more memories and the computer program code are further configured to, with the one or more processors, cause the apparatus to modify the at least one displayed user interface element by rotating at least one of the at least one displayed user interface element on a user interface of the apparatus, wherein the rotated one of the at least one displayed user interface element indicates the one or more determined directions of the one or more prominent sound sources.

3. The apparatus of claim 2, wherein rotating further comprises rotating the at least one of the at least one displayed user interface element by rotating an axis of the at least one displayed user interface element approximately parallel to the one or more determined directions of the one or more prominent sound sources.

4. The apparatus of claim 1, wherein the one or more memories and the computer program code are further configured to, with the one or more processors, cause the apparatus to modify a selected one of the at least one displayed user interface element by moving the selected one of the at least one displayed user interface element on a user interface of the apparatus in a second direction away from the one or more determined directions of the one or more prominent sound sources.

5. The apparatus of claim 4, wherein the moving further comprises moving the selected at least one displayed user interface element on the user interface on a trajectory that is at least in part along the second direction.

6. The apparatus of claim 1, wherein the one or more memories and the computer program code are further configured to, with the one or more processors, cause the apparatus to modify a selected one of the at least one displayed user interface element, wherein the selected one of the at least one displayed interface element is configured to react to a sound of the one or more prominent sound sources.

7. The apparatus of claim 1, wherein the one or more memories and the computer program code are further configured to, with the one or more processors, cause the apparatus to modify a selected one of the at least one displayed user interface element by modifying one or more colors of the selected one of the at least one displayed interface element based on the one or more determined directions of the one or more prominent sound sources.

8. The apparatus of claim 1, wherein the at least one displayed user interface element comprises at least one of an icon on a user interface of the apparatus, text on the user interface, a background of the] user interface, a photograph on the user interface, content on the user interface, or a page of the user interface.

9. The apparatus of claim 1, wherein the at least one displayed user interface element comprises a page of a user interface on the display of the apparatus, and wherein the one or more memories and the computer program code are further configured to, with the one or more processors, cause the apparatus to modify a selected one of the at least one displayed user interface element by moving, responsive to the one or more determined directions of the one or more prominent sound sources, a page of the user interface off the display and moving a different page of the user interface onto the display.

10. The apparatus of claim 1, wherein the at least one displayed user interface element comprises an unlock icon of a user interface on the display of the apparatus, and wherein the one or more memories and the computer program code are further configured to, with the one or more processors, cause the apparatus to modify a selected one of the at least one displayed user interface element by moving, responsive to the one or more determined directions of the one or more prominent sound sources, the unlock icon from an initial position to an end position.

11. A method, comprising:

determining, using signals captured from two or more microphones configured to detect an acoustic signal from one or more prominent sound sources, one or more directions of the one or more prominent sound sources relative to a position of at least one of the two or more microphones, wherein an apparatus comprises the at least one of the two or more microphones, where locations of the two or more microphones are predetermined inside the apparatus;

presenting at least one displayed user interface element that is to receive a modification to provide directional information of one or more prominent sound sources, wherein the at least one displayed user interface element is presented for at least one purpose independent of the one or more prominent sound sources; and modifying the at least one displayed user interface element dependent on the one or more determined directions while the two or more microphones are capturing the acoustic signal, wherein the at least one displayed user interface element is displayed on a display of the apparatus to provide an indication at least in part of the one or more determined directions of the one or more prominent sound sources so that a relative position of the one or more prominent sound sources to the apparatus is indicated from the modified at least one displayed user interface element while the two or more microphones are capturing the acoustic signal.

12. The method of claim 11, wherein modifying further comprises rotating one of the at least one displayed user interface element on a user interface of the apparatus, wherein the rotated one of the at least one displayed user interface element indicates one or more determined directions.

13. The method of claim 12, wherein the rotating further comprises rotating the one of the at least one displayed user interface element by rotating an axis of the at least one displayed user interface element approximately parallel to the one or more determined directions.

14. The method of claim 11, wherein the modifying further comprises modifying the at least one displayed user interface element by moving the at least one displayed user interface element on a user interface of the apparatus in a second direction away from the one or more determined directions.

15. The method of claim 14, wherein the moving further comprises moving the at least one displayed user interface element on a user interface of the apparatus on a trajectory that is at least in part along the second direction.

16. The method of claim 11, wherein the modifying further comprises modifying one or more colors of the at least one displayed user interface element based on the one or more determined directions.

17. The method of claim 11, wherein the at least one user interface element comprises a page of a user interface on the display of the apparatus, and wherein the modifying further comprises moving, responsive to the one or more determined directions, the page of the user interface off the display and moving a different page of the user interface onto the display.

18. The method of claim 11, wherein the at least one displayed user interface element comprises an unlock icon of a user interface on the display of the apparatus, and wherein modifying further comprises moving, responsive to the one or more determined directions, the unlock icon from an initial position to an end position.

* * * * *